(12) United States Patent
Celie et al.

(10) Patent No.: US 9,733,791 B2
(45) Date of Patent: Aug. 15, 2017

(54) ACCESS TO CONTEXTUALLY RELEVANT SYSTEM AND APPLICATION SETTINGS

(75) Inventors: Vincent Y. Celie, Seattle, WA (US); Niels van Dongen, Orcas, WA (US); Ian Robert Toal, SeaTac, WA (US); Ryan M. Cavalcante, Seattle, WA (US); Timothy Andrew McAdoo, Bothell, WA (US); Soonil J. Nagarkar, Seattle, WA (US); Bennett Hornbostel, Seattle, WA (US); Tarek Mahmoud Sayed, Sammamish, WA (US); Gerardo Villarreal Guzman, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 13/230,566

(22) Filed: Sep. 12, 2011

(65) Prior Publication Data

US 2013/0067388 A1 Mar. 14, 2013

(51) Int. Cl.
*G06F 3/0481* (2013.01)
*G06F 3/0484* (2013.01)
*G06F 3/0488* (2013.01)

(52) U.S. Cl.
CPC ........ *G06F 3/04817* (2013.01); *G06F 3/0484* (2013.01); *G06F 3/04847* (2013.01); *G06F 3/0488* (2013.01)

(58) Field of Classification Search
CPC .. G06F 3/04817; G06F 3/04847; G06F 3/048; G06F 3/0481; G06F 3/0482; G06F 3/0484

USPC ................................ 715/781, 779, 810, 825
See application file for complete search history.

(56) References Cited

U.S. PATENT DOCUMENTS

| | | | |
|---|---|---|---|
| 4,899,136 A * | 2/1990 | Beard et al. ................... | 345/156 |
| 5,594,859 A * | 1/1997 | Palmer et al. ................ | 715/756 |
| 5,757,371 A * | 5/1998 | Oran et al. .................... | 715/779 |
| 6,122,558 A | 9/2000 | Barnes et al. | |
| 6,487,665 B1 * | 11/2002 | Andrews et al. ............... | 726/26 |
| 6,597,314 B1 * | 7/2003 | Beezer et al. ................ | 715/812 |
| 7,434,211 B2 | 10/2008 | Wynn et al. | |
| 7,526,539 B1 * | 4/2009 | Hsu ............................... | 709/223 |
| 7,668,944 B2 | 2/2010 | Leib et al. | |
| 7,703,037 B2 * | 4/2010 | McGlinchey ..... | G06F 17/30873 715/747 |
| 7,712,039 B2 * | 5/2010 | Banks .......................... | 715/772 |
| 8,265,595 B1 * | 9/2012 | Reeves et al. ................ | 455/410 |
| 8,856,859 B2 * | 10/2014 | Kirkup et al. .................... | 726/1 |

(Continued)

OTHER PUBLICATIONS subset. Dictionary.com. Dictionary.com Unabridged. Random House, Inc. http://www.dictionary.com/browse/subset (accessed: Jul. 14, 2016).*

(Continued)

*Primary Examiner* — Amy M Levy
(74) *Attorney, Agent, or Firm* — Lee & Hayes, PLLC

(57) ABSTRACT

Access to system and application settings may be gained from one place without leaving the context of an application. System and application settings accessed may be limited to settings that are relevant to the application or to the context of the application. An application may determine what application settings are displayed to a user. A user may to control some of the resources an application may access.

17 Claims, 15 Drawing Sheets

(56) References Cited

U.S. PATENT DOCUMENTS

| | | | |
|---|---|---|---|
| 2002/0191019 A1* | 12/2002 | Pickett | 345/764 |
| 2003/0013483 A1* | 1/2003 | Ausems et al. | 455/556 |
| 2004/0103274 A1* | 5/2004 | Shih-Chieh et al. | 713/2 |
| 2004/0127190 A1* | 7/2004 | Hansson et al. | 455/403 |
| 2004/0153973 A1* | 8/2004 | Horwitz | 715/530 |
| 2005/0055633 A1* | 3/2005 | Ali et al. | 715/513 |
| 2005/0060412 A1* | 3/2005 | Chebolu et al. | 709/227 |
| 2005/0071775 A1* | 3/2005 | Kaneko | 715/801 |
| 2005/0091346 A1* | 4/2005 | Krishnaswami | G06F 9/44505 709/220 |
| 2005/0091658 A1* | 4/2005 | Kavalam et al. | 718/104 |
| 2005/0114494 A1* | 5/2005 | Beck et al. | 709/224 |
| 2005/0246761 A1* | 11/2005 | Ross et al. | 726/1 |
| 2006/0184828 A1* | 8/2006 | Wynn et al. | 714/38 |
| 2006/0253794 A1* | 11/2006 | Wilson | 715/779 |
| 2006/0284852 A1* | 12/2006 | Hofmeister et al. | 345/173 |
| 2007/0067737 A1* | 3/2007 | Zielinski et al. | 715/810 |
| 2007/0240074 A1* | 10/2007 | Banks | 715/771 |
| 2007/0294312 A1* | 12/2007 | Seshadri | G06F 9/44505 |
| 2008/0127162 A1* | 5/2008 | Xu | G06F 9/44505 717/168 |
| 2008/0127354 A1* | 5/2008 | Carpenter et al. | 726/28 |
| 2008/0209194 A1* | 8/2008 | Prabakaran | G06F 9/44505 713/1 |
| 2009/0024992 A1 | 1/2009 | Kulaga et al. | |
| 2009/0064038 A1 | 3/2009 | Fleischman et al. | |
| 2010/0041382 A1* | 2/2010 | Van Os et al. | 455/418 |
| 2010/0082701 A1* | 4/2010 | Maheshwari | G06F 17/3056 707/803 |
| 2010/0182244 A1* | 7/2010 | Onda | G06F 3/0489 345/172 |
| 2011/0087976 A1 | 4/2011 | Cisler et al. | |
| 2011/0167383 A1* | 7/2011 | Schuller et al. | 715/808 |
| 2011/0190009 A1* | 8/2011 | Gerber et al. | 455/456.3 |
| 2011/0252381 A1* | 10/2011 | Chaudhri | 715/838 |
| 2012/0124515 A1 | 5/2012 | Li et al. | |
| 2012/0124545 A1* | 5/2012 | Wuschek | G06F 8/20 717/100 |
| 2012/0143900 A1* | 6/2012 | Ainslie et al. | 707/769 |
| 2012/0143923 A1* | 6/2012 | Whitney | G06F 17/30997 707/803 |

OTHER PUBLICATIONS

MacGuides (Opening an Application's Preferences Window. Last edited Dec. 18, 2005. Available Feb. 2006. Retrieved from "http://guides.macrumors.com/Opening_an_Application's_Preferences_Window" on Jul. 13, 2016.*

"Settings are in the Settings App", Recent Posts, retrieved on Sep. 6, 2011 at: http://www.settingsareinthesettingsapp.com/settings-in-app-or-in-settings, 5 pgs.

* cited by examiner

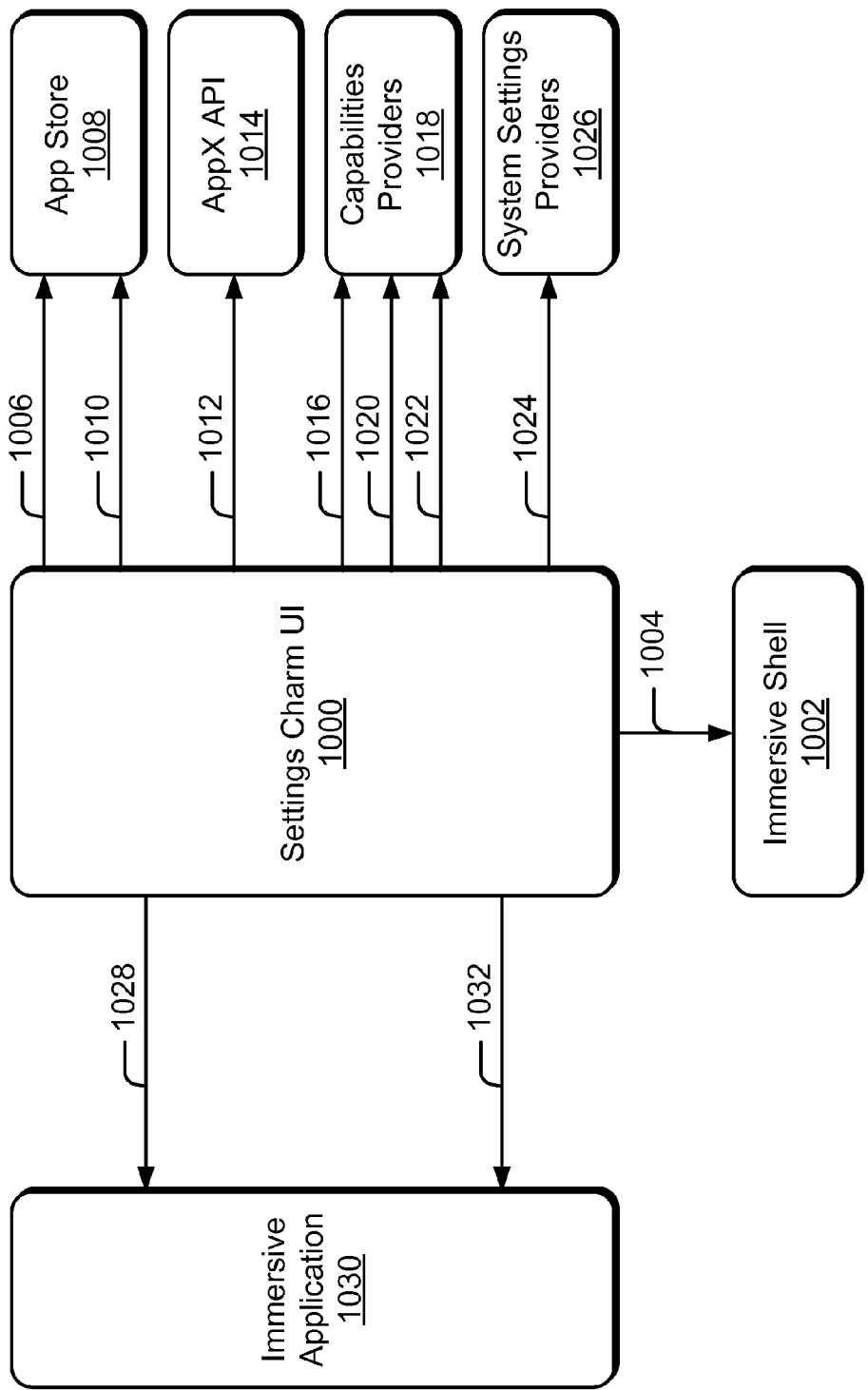

ACCESS TO CONTEXTUALLY RELEVANT SYSTEM AND APPLICATION SETTINGS

BACKGROUND

A user of an application running on a computing system may have reason to view or change a setting relating to the application. Often the application and computing system provide a user the ability to view and possibly change the setting. However, often the user must access the application settings and the system settings in multiple different locations and/or through multiple different interfaces. This may be cumbersome for the user and may result in a poor user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject of this disclosure describes techniques to access system and application settings from one place without leaving the context of an application. Additionally or alternatively, system and application settings accessed may be limited to settings that are relevant to the application or to the context of the application. The techniques may allow an application to determine what application settings are displayed to a user. The techniques may also allow a user to control what resources an application may access.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 10 is a block diagram of an illustrative communication flow usable to access system and application settings.

DETAILED DESCRIPTION

Overview

This disclosure describes accessing system and application settings from a common location without leaving the context of an application, a desktop, and/or a system launcher. This disclosure also discusses presenting system and application settings that are relevant to the application and/or the context of the application, the desktop, and/or the system launcher.

Often, a user may use an application during which, the user may desire to view and/or change a setting relating to the application. The user may have to search through application specific menus and paths to access settings determined by the application. Often times, the application specific menus and paths differ from one application to another. The differences between programs may require a user to learn different menus and paths and may cause frustration.

Additionally, the user may desire to change a system setting that affects how the application performs or is displayed. To change the settings, often, the user must exit the application or change context to a system level view to access system settings. The user may then have to navigate through various menus and paths to find the system settings relevant to the application. Upon finding the relevant system setting, the user may make a change, and then have to return to the application to evaluate the results of the setting change. Additionally, the user may have to restart the application for the new setting to take effect.

This may also contribute to user frustration. This frustration may influence a user's experience and may influence a user's selection of computing device, operating system, and applications.

This disclosure discusses accessing system and application settings from one place without leaving the context of the application. This may allow a user to find the system and application settings in a consistent and predictable fashion. Additionally, if a user makes a change to a setting, the user may see and evaluate the results of the change immediately upon the setting change since the user is not required to leave the context of the application. Further, only relevant settings may be displayed, allowing a user to not navigate through settings that are not relevant to the application context.

Illustrative Access System

Figure 1:
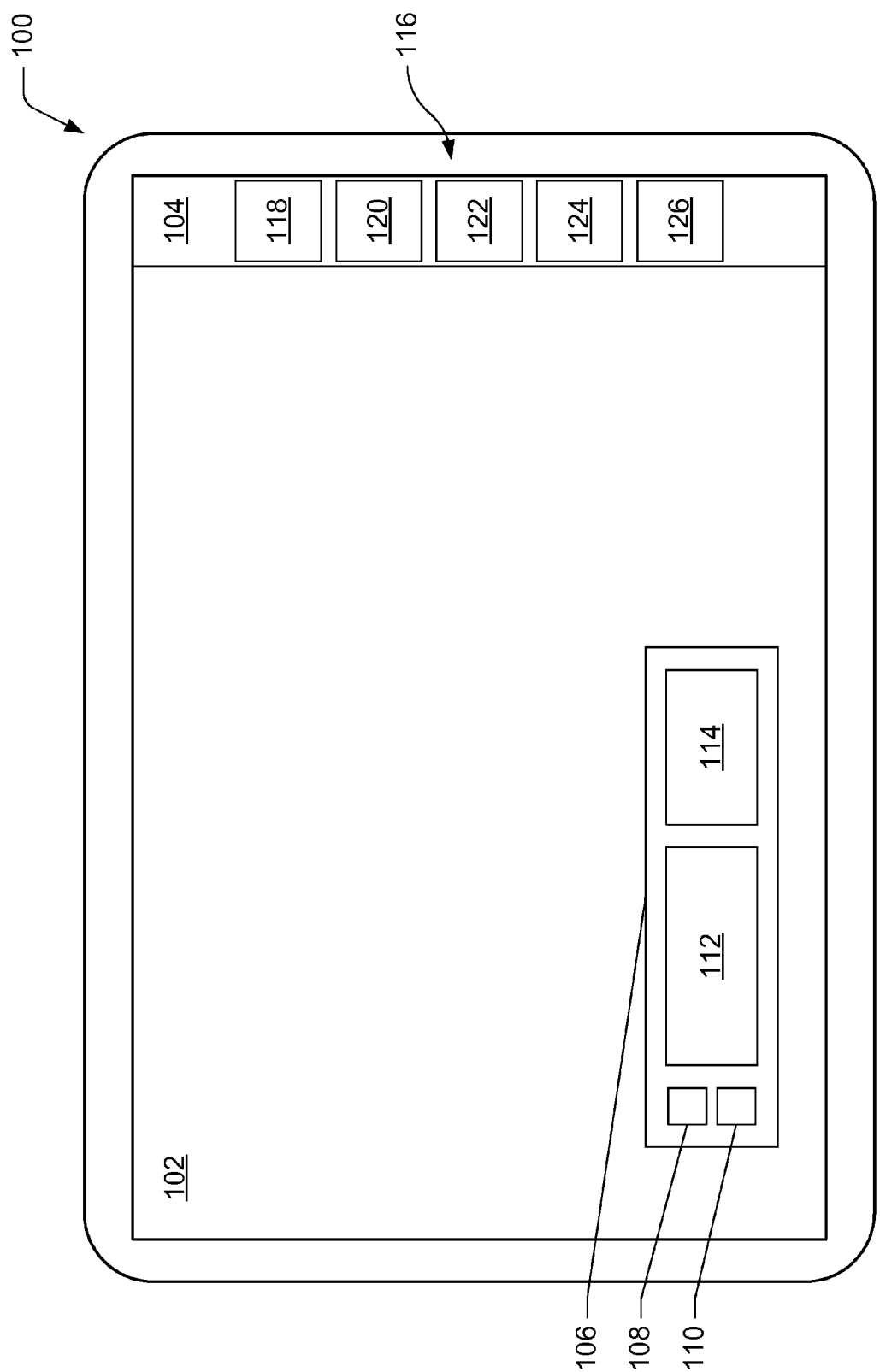
FIG. 1 is a view of an illustrative embodiment of accessing a settings access system including an illustrative application context with illustrative control options.

FIG. 1 shows an illustrative embodiment of accessing a settings access system 100 that may be used to view, and in some cases modify, system and application settings. For example, FIG. 1 shows an application context 102. The application context 102 may comprise an immersive application filling a portion of or an entire viewing display. Without leaving the application context 102, an access bar 104 or "charms bar" may become viewable or visible. The access bar 104 may become viewable by sliding in from an edge of the display. For example, in a touch screen embodiment, a user may swipe from the outside edge towards the center of the screen causing the access bar 104 to appear to be drug into position. Additionally or alternatively, a user may move a mouse cursor into the area of the access bar 104 or to an edge of the display to cause the access bar 104 to appear and/or become viewable. Additionally, when the access bar 104 becomes viewable, an additional viewable area 106 may appear. This additional viewable area 106 may be proximate to or distant from the access bar 104. The additional viewable area 106 may display additional information. For example, the additional viewable area 106 may include icons 108 and 110 to show the status of a network connection or a battery life respectively. Additionally, area 112 may display the time and area 114 may display the day of the week and the date. The foregoing are non-limiting examples.

Access bar 104 may comprise informational and/or selectable areas 116. Informational and/or selectable areas 116 may comprise "charms" allowing access to different features of an application, computing device, or system. For example, selecting charm 118 may allow a user to search, charm 120 may allow a user to share something, charm 122 may access a general menu of options, charm 124 may allow a user to connect to a network, network device, remote device, and/or a combination or subset thereof, while charm 126 may allow access to settings. In various embodiments, additional "charms" may be accessed by scrolling the access bar 104 up or down, and/or left or right.

Access bar 104 may disappear by being dismissed. When access bar 104 disappears or is replaced, an embodiment provides that additional viewing area 106 also disappears. For example, the access bar 104 may be dismissed by a "light dismiss." A light dismiss may comprise touching or selecting an area outside of the access bar 104. Selecting a charm may also cause the access bar to disappear or be replaced by a window or other display. In an embodiment, for example, selecting charm 126 may cause a settings window to be displayed.

Figure 2:
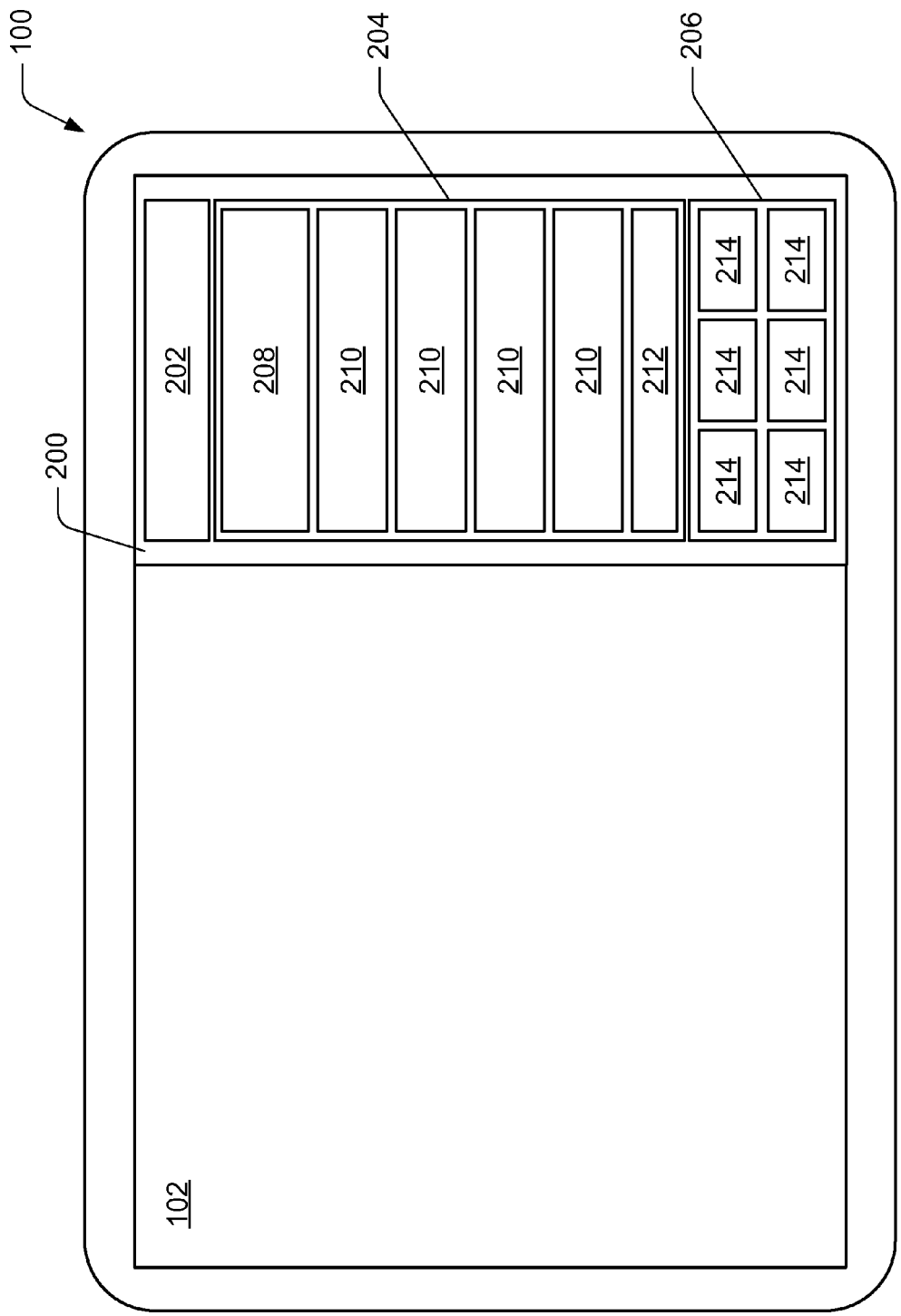
FIG. 2 is a view of an illustrative embodiment of a settings access system accessed in FIG. 1 with an illustrative settings window displayed.

FIG. 2 shows an illustrative settings window 200 or settings charm window. Settings window 200 may comprise a header 202, an application pane 204, and a system pane 206. The application pane 204 may comprise an application identification block 208, application settings commands 210, and system access link 212. An embodiment provides that an application may determine what, if anything, is displayed in application settings commands 210. Stated another way, zero, one, or more application settings commands 210 may be visible as defined by the application. System pane 206 may comprise system widgets or system interfaces 214. In various embodiments, the number of settings commands 210 and system interfaces 214 may be greater than or fewer than the number illustrated in the figures. Also, in various embodiments, additional settings interfaces may be accessed by scrolling the settings window 200 up or down, and/or left or right. Additionally, in various embodiments, additional settings interfaces may be accessed by scrolling the panes 204 and 206 up or down, and/or left or right.

Figure 3:
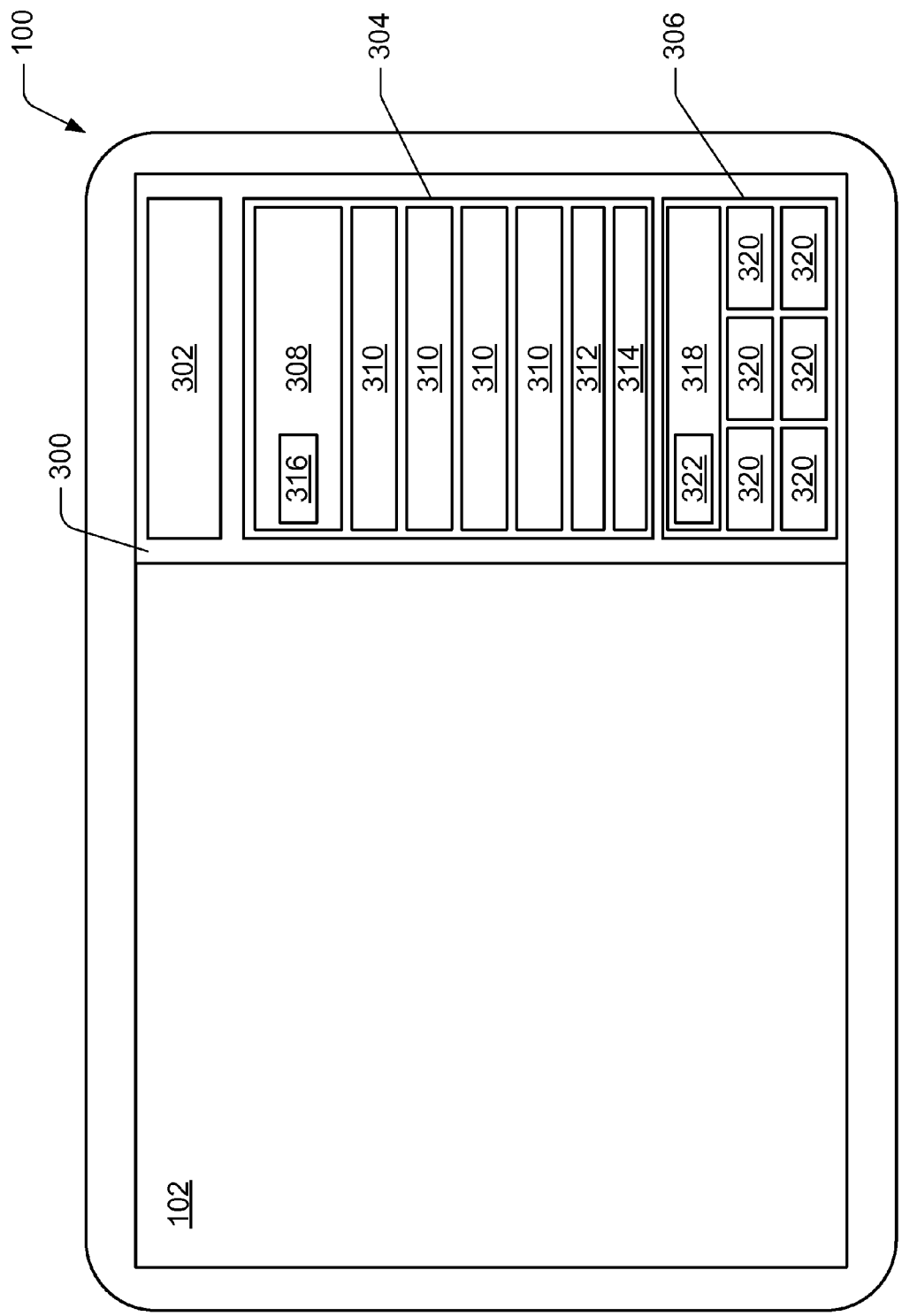
FIG. 3 is a view of another illustrative embodiment of a settings access system accessed in FIG. 1 with another illustrative settings window displayed.

FIG. 3 shows an additional illustrative embodiment of settings window 300. Settings window 300 may comprise a header 302, an application pane 304, and a system pane 306. The application pane 304 may comprise an application identification block 308, application settings commands 310, application store link 312, and system access link 314. Application identification block 308 may comprise an application logo or icon 316 and may display application information, including, but not limited to the application name, version, creator and/or publisher among other information. An embodiment provides that selection of application identification block 308 may allow an entry point to a main user interface (UI) defined by the application. Further, an embodiment provides that an application may determine what, if anything, is displayed in application settings commands 310.

System pane 306 may comprise a main systems setting block 318 and system widgets or system interfaces 320. Main systems setting block 318 may comprise a logo or icon 322 and may display system information. In various embodiments, the number of settings commands 310 and system interfaces 320 may be greater than or fewer than the number illustrated in the figures.

Similar to the access bar 104, settings windows 200 and 300 may be dismissed, for example, by a "light dismiss."

In various embodiments, selection of various areas of the illustrative settings windows 200 and 300 may cause various actions to occur. For example, selection of application identification block 208 of FIG. 2 may cause the application store to appear in a window pane or in a new application view. Selection of application settings commands 210 of FIG. 2 or selection of application identification block 308 or application settings commands 310 of FIG. 3 may cause an application defined window to appear. The number and nature of the viewable commands and destinations of the links may be determined by the application. In various embodiments, the application may use application programming interface (API) commands to set what is displayed as well as the action taken, if any, when selected. In various embodiments, the number of application settings commands 210, 310 may be limited to a maximum of four where an application may designate anywhere between zero and the maximum four. However, in other embodiments greater than four application settings commands may be accessed by scrolling, panning, and/or paging within the application pane 204, 304. The application may also cause what is displayed and the nature the action taken if selected to be based on the context of the application when the settings windows 200 or 300 become visible.

For example, an application may determine that certain application settings are appropriate to show when the application is displaying certain information or when the application is performing certain functions. As a non-limiting example, an application may determine that when the application is displaying multiple views of one object, an application setting relating to the number, orientation, and content of the views should be shown in the settings window. However, when the application is performing a data intensive calculation, an application setting relating to the number, type, and response to any errors should be shown in the settings window. The foregoing are two illustrative examples of using application context to influence the displayed settings.

Figure 4:
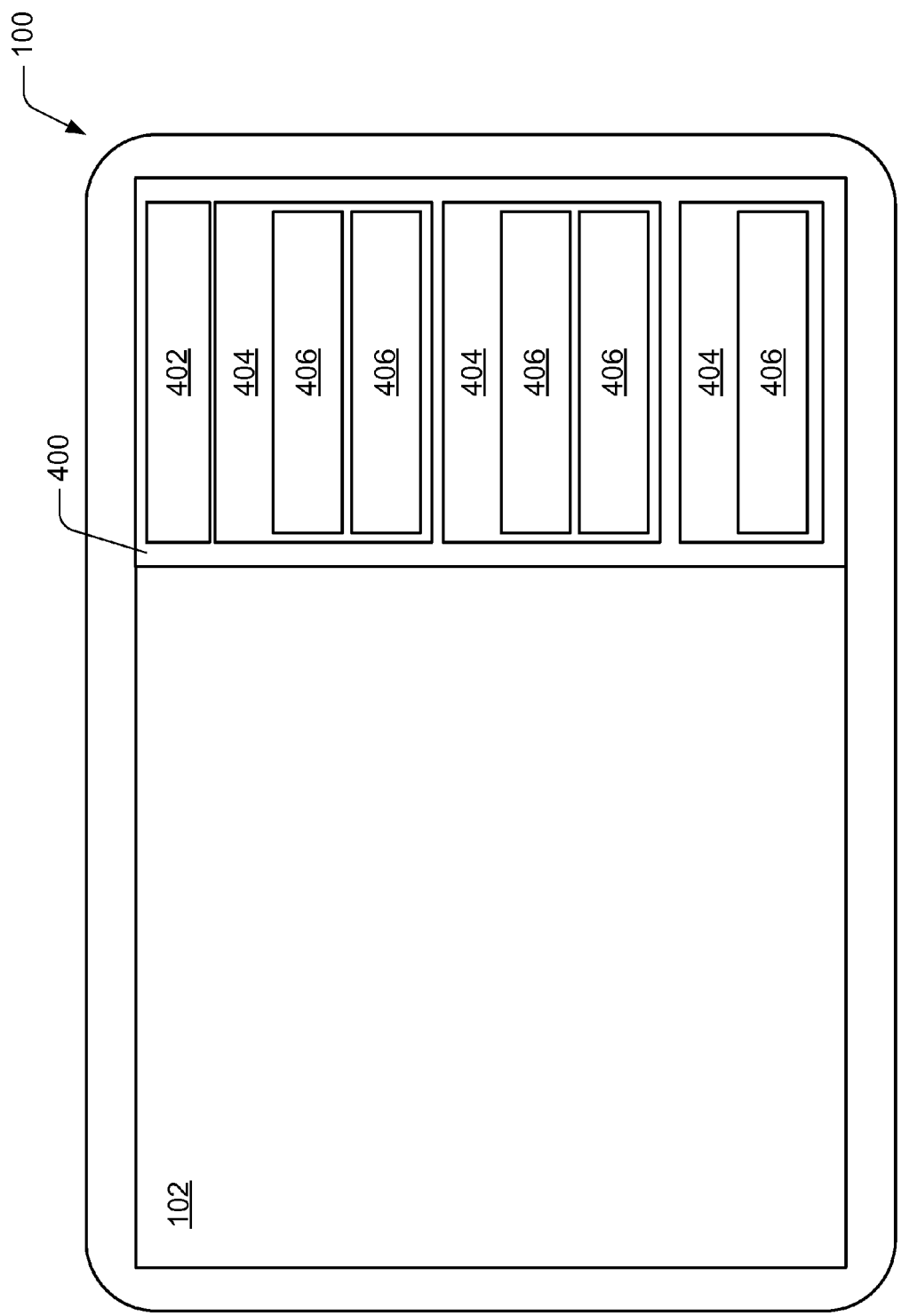
FIG. 4 is a view of an illustrative embodiment of a system access system of FIG. 2 or 3 with an illustrative system access pane displayed.

Additionally or alternatively, selection of system access links 212 and 314 may cause a system access pane to appear. FIG. 4 shows an illustrative embodiment of a system access pane 400. The system access pane 400 may substantially fill the area defined by settings windows 200 and 300. It may also fill a smaller portion or cause the area of settings windows 200 and 300 to increase. Additionally, system access pane 400 may be considered to be a new and separate window from settings windows 200 and 300.

System access pane 400 may comprise a header 402 and one or more system capability provider subpanes 404. The number of system capability provider subpanes 404 may vary from zero to an integer greater than 100. In various embodiments, the number and nature of capability provider subpanes 404 may depend on the application, the context of the application, and the capabilities and resources of the computing device or system on which the application is running. Capability provider subpanes 404 may comprise capability provider elements 406. By way of example, and not limitation, capability provider subpanes 404 may include settings related to privacy, notifications, lock screen, and access to data sources. The number and nature of capability provider elements 406 may be directly dependent upon the capability provider subpane 404 of which it is a part.

Illustrative Example of an Access System

Figure 5:
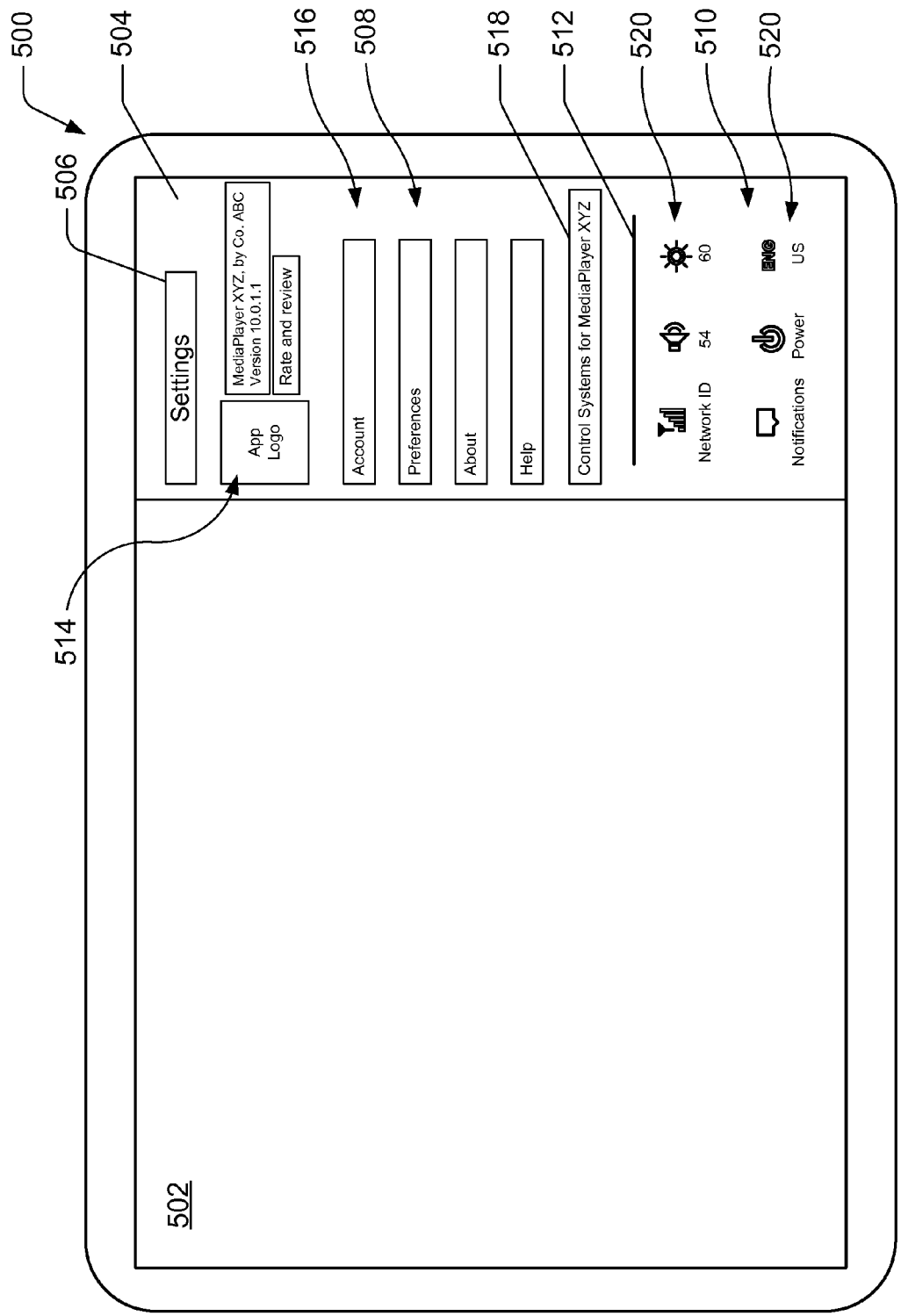
FIG. 5 is a view of an illustrative embodiment of a settings access system with an illustrative settings window displayed.

An illustrative example of an access system may be found in FIGS. 5-8. FIG. 5 shows a settings access system 500 with an application context 502. Application context 502 may take various forms. For example, application context 502 may comprise an immersive program meaning that the program fills the entire display. An application context may comprise shared with two or more applications filling a portion of or an entire display. An application context may also comprise various views commonly known throughout the computing industry including that known as a desktop view, a system view, or other views. In various embodiments, a system or a desktop view may be treated as if the system or desktop is an immersive application itself.

FIG. 5 shows an example where an application context 502 comprises an immersive application, for example Zune® published by Microsoft®. After selection of a settings charm from a bar similar to system access bar 104, a settings window 504 may appear. Settings window 504 may comprise a settings header 506, an application pane 508, and a system pane 510. Separation between the settings header 506, the application pane 508, and the system pane 510 may be marked or unmarked. For example, the separation between the settings header 506 and the application pane 508 is not specifically marked. However, in other examples, the separation between the application pane 508 and the system pane 510 may comprise a divider 512 or a border.

Application pane 508 may comprise an application identity area 514, application settings commands 516, and a system access link 518. The identity area 514 may comprise an application logo or icon, information about the application, for example the name of the application, the publisher, the creator, the version, or other information. The identity area 514 may provide links to an application store or locations where a user may gather more information or give information about the program.

In various embodiments, application settings commands 516 may comprise application defined options for a user to select, view, and modify. For example, an application settings command 516 may be labeled "Account." Accordingly, selection of this application settings command may cause a new window or pane to appear as shown in FIG. 6.

Figure 6:
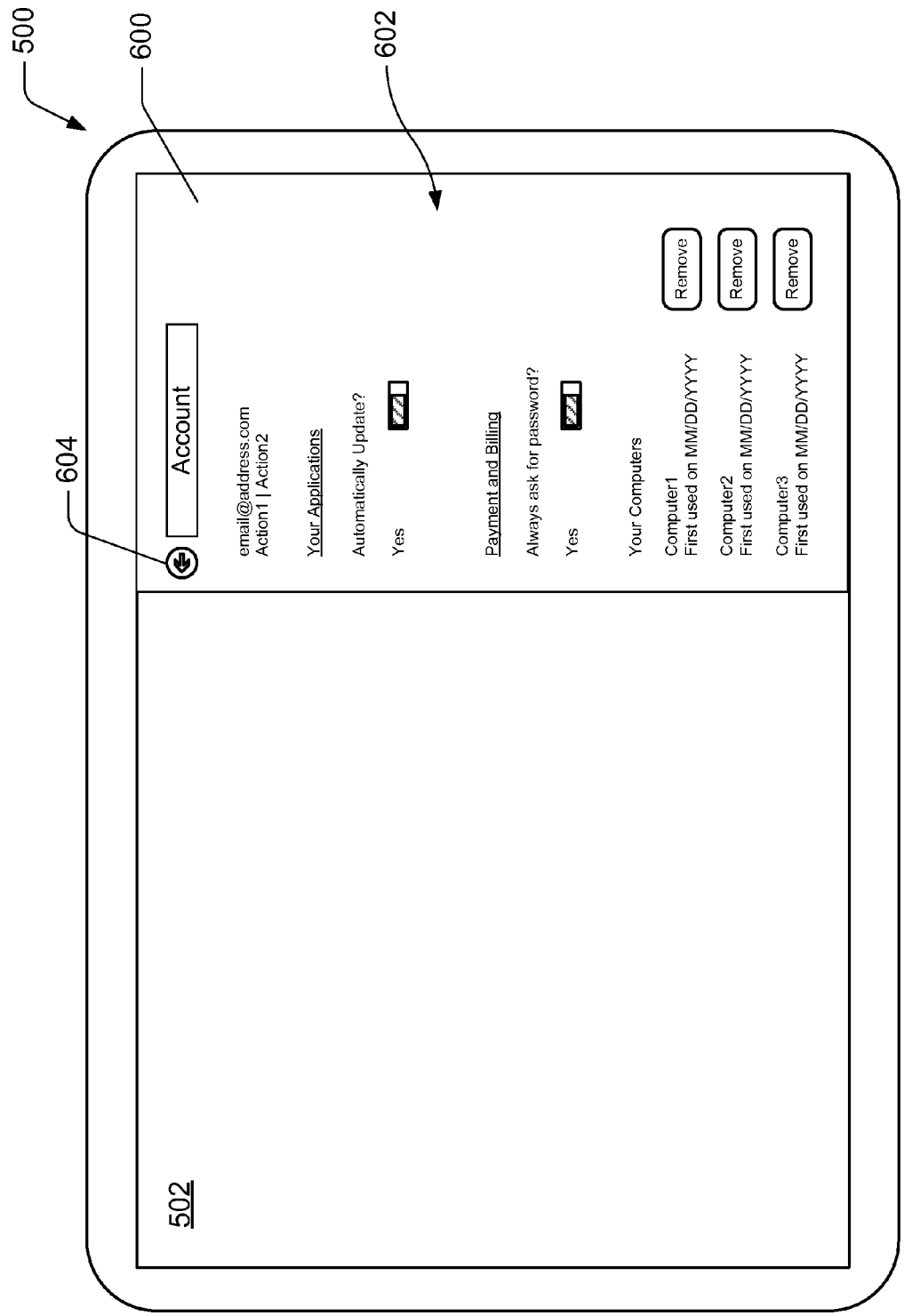
FIG. 6 is a view of an illustrative embodiment of a system access system of FIG. 5 with an illustrative application access pane displayed.

FIG. 6 shows an application settings pane 600 with application defined content 602. The defined content 602 may provide for viewing, evaluation, and/or control of some or all settings of the application. The application settings pane 600 may also provide an interface 604 to return to the settings window 504.

Selection of system access link 518 may cause a system access pane to appear.

Figure 7:
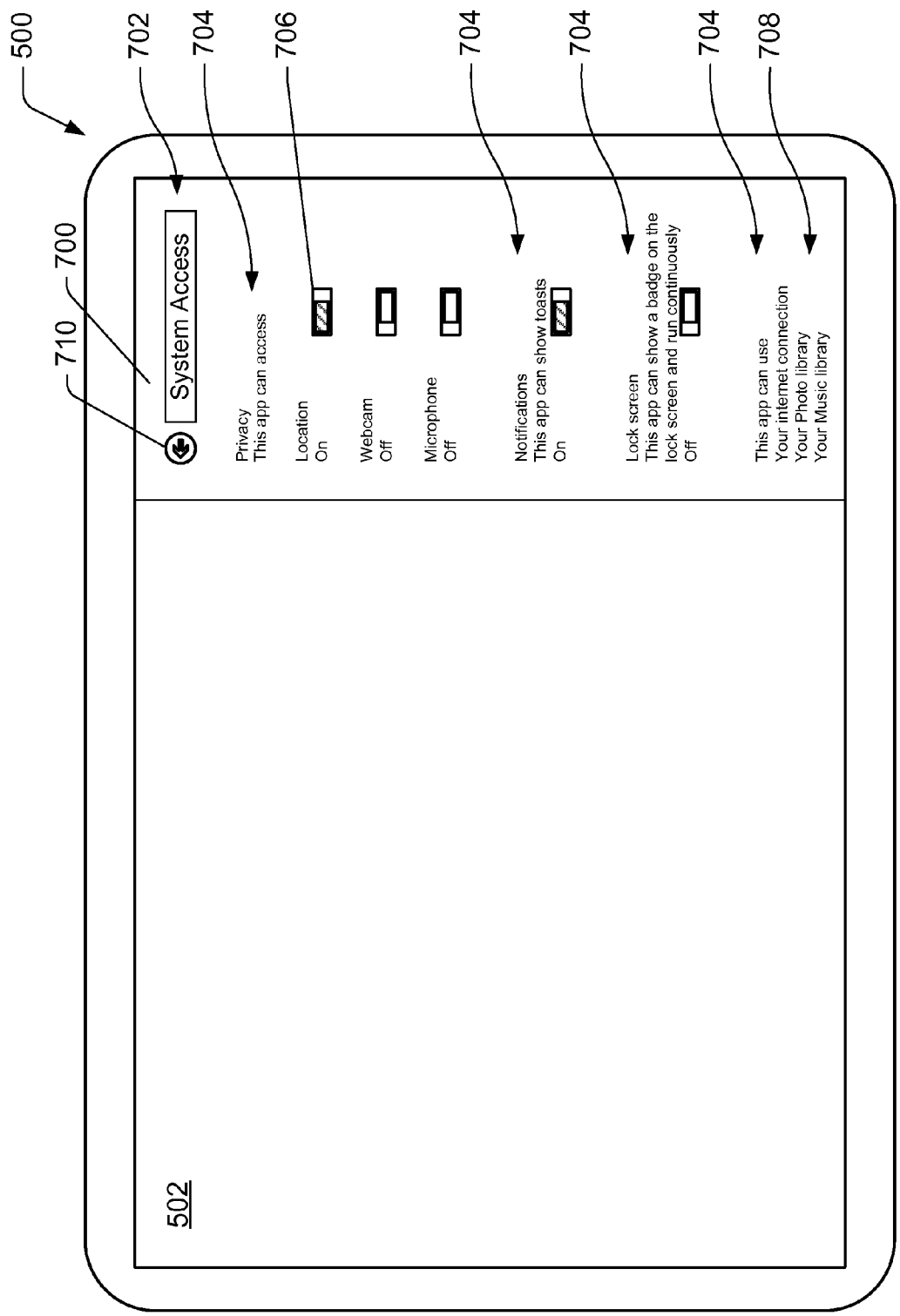
FIG. 7 is a view of an illustrative embodiment of a system access system of FIG. 5 with an illustrative system access pane displayed.

FIG. 7 shows a system access pane 700 that may comprise a header 702 and system capability provider subpanes 704. Based upon the application use in this illustrative example, system capability provider subpanes 704 may include system capabilities affecting privacy, notifications, locking screens, and access to other system resources. This example provides the ability for a user to choose whether to allow or disallow the program from accessing some of the displayed features. For example, toggling of the visual representations of switch 706 may allow or disallow the program to access the location of the system, user, or computing device. Some system capability provider subpanes 704 may give information 708, but not allow a user to change the program's ability to access. The system access pane 700 may also provide an interface 710, selection of which may cause the return to the settings window 504.

Returning to FIG. 5, system pane 510 may comprise system interfaces 520. System interfaces 520 may comprise access to view and, in some embodiments, modify the system settings. System interfaces 520 may comprise access to network identifications currently available or connected to; the volume, the brightness of the display; available notifications and ability to stop the notifications; access to the power settings including ability to restart, shutdown, sleep, and/or hibernate; and the language of the controls, for example a keyboard. Additionally or alternatively, selection may cause a control to become visible within the system window and/or pane. Selection of a system interface 520 may cause the pane or view to change to a different pane reflecting information associated with the selected system interface 520. For example, a pane similar to the system access pane 400 shown in FIG. 4 may become visible where the displayed content reflects the associated information. For example, if system interface 520 that is selected is associated with the network identification, the new pane may display a list of the available networks, the strength of the network signal, the security of the network, as well as an ability to connect to or disconnect from a network, indication of whether the system is connected to a network, among other relevant information and control interfaces.

Figure 8:
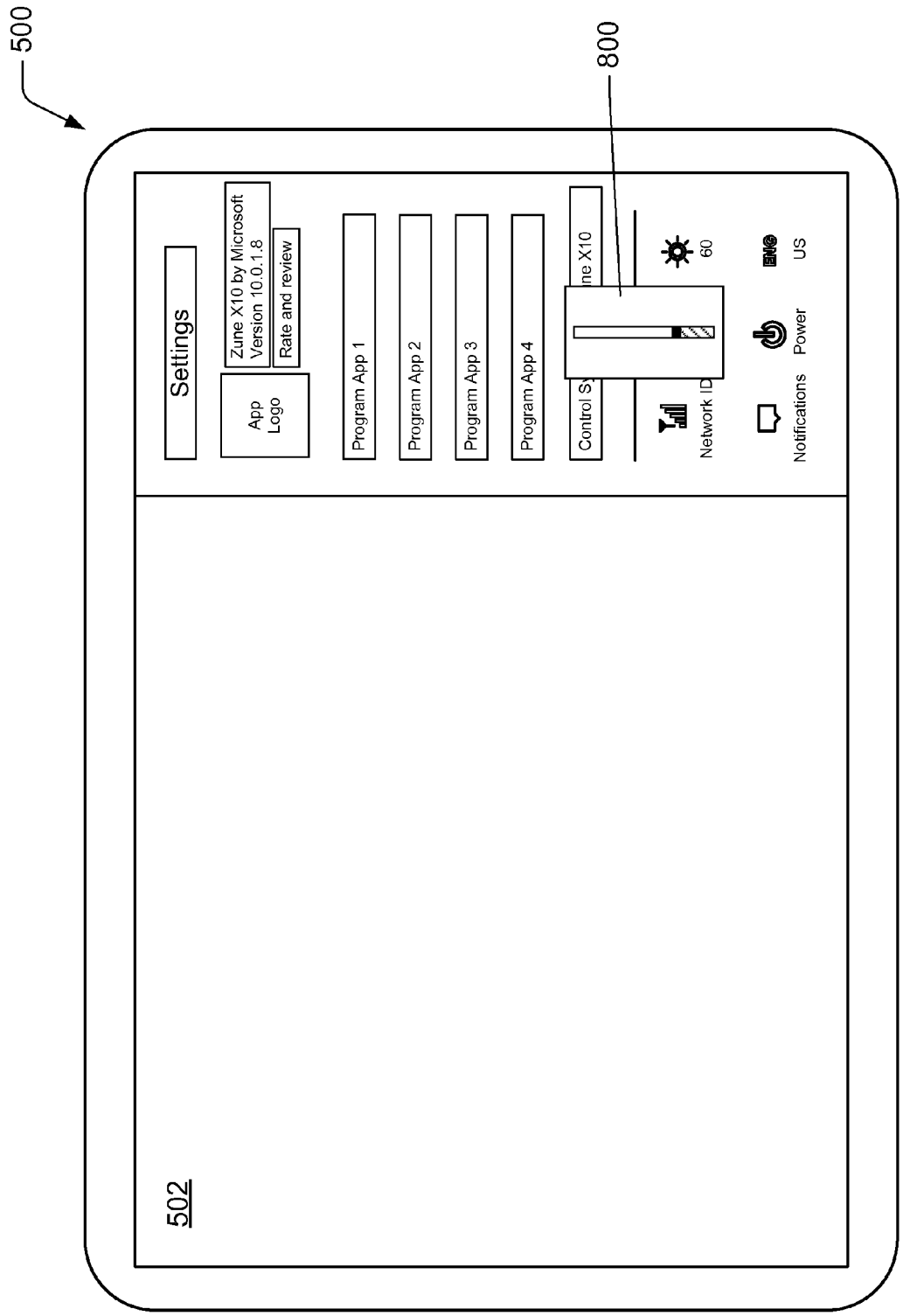
FIG. 8 is a view of an illustrative embodiment of a settings access system of FIG. 5 with an illustrative system setting adjustment control displayed.

FIG. 8 shows an illustrative example where the system interface 520 of FIG. 5 corresponding to the volume was selected. FIG. 8 shows a control 800 that is associated with the selected system interface, in this case, for example a slider bar representing the volume level of the system. The level may be changed up or down without leaving the context of the window or the application. Further, the setting may be set continuously as the control is changed. The setting may be set after a user has completed an interaction with it. These may be commonly known as instant committal of the settings. Additionally or alternatively, an additional input may be required to change setting as is commonly done in various programs and user interfaces.

Illustrative Operational Environment

Figure 9:
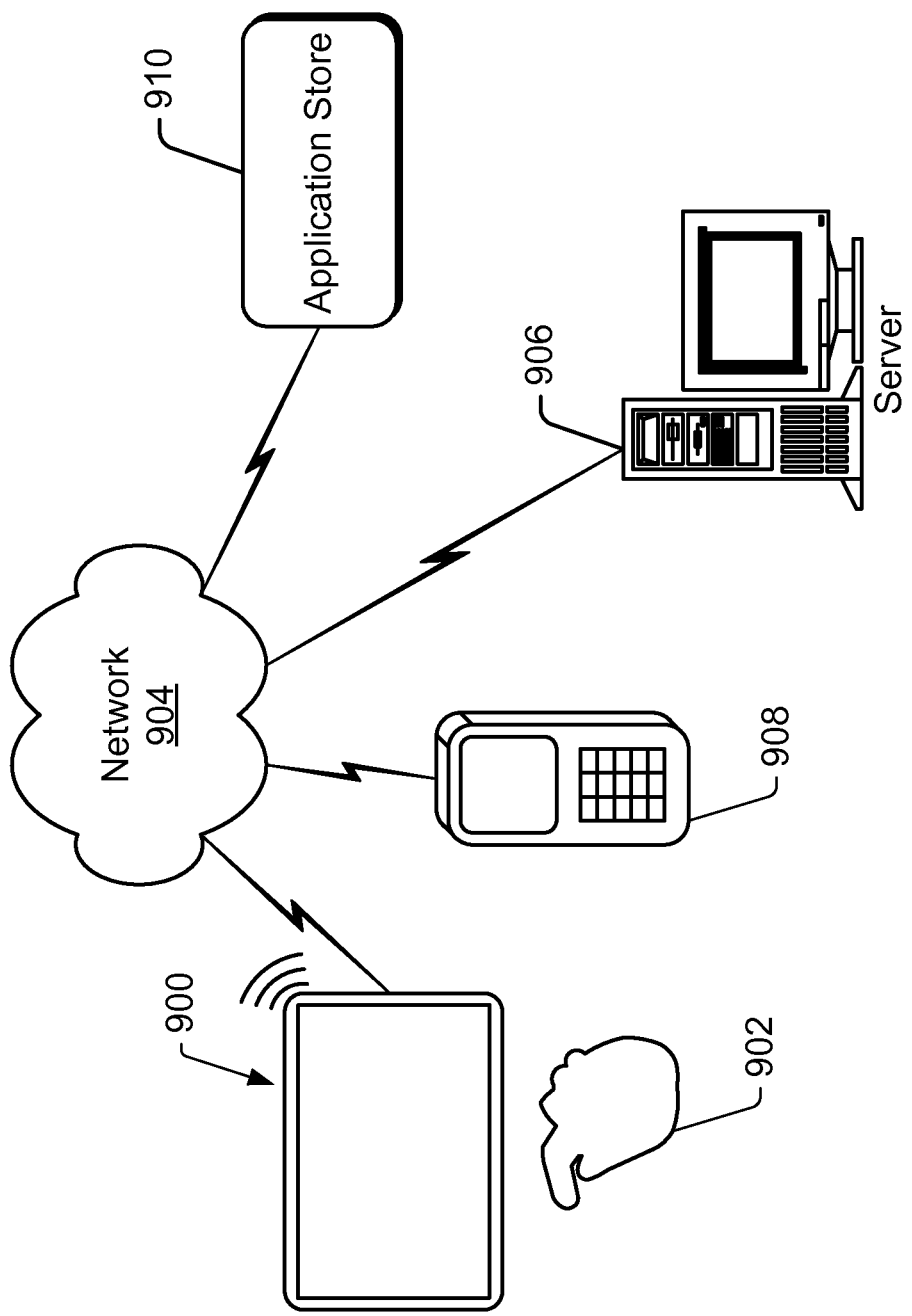
FIG. 9 is a schematic diagram of an illustrative environment where the settings access system of FIG. 1 may operate.

FIG. 9 shows a schematic diagram of an illustrative environment where an illustrative settings access system may operate. For example, a settings access system may operate on a computing device 900. The computing device 900 may interact with a user 902 directly or indirectly, through a touch screen, a mouse, keyboard, voice, or other methods known in the art. The computing device 900 may be connected to a network 904. The network 904 may provide access to other computing devices including a server 906, mobile devices 908, and/or other connections and/or resources. One connection and/or resource may be an application store 910. Connection may be wired or wireless.

Illustrative Operational and Communication Flow

Various embodiments of a settings access system may use various methods of obtaining and presenting information. For example, FIG. 10 shows a block diagram of an illustrative communication flow usable to access system and application settings. For example, a settings charm 1000, that may comprise a user interface (UI), may communicate with various pieces of a computing device, operating system, applications, and available resources to query, gather information, and/or affect settings. For example, the settings charm 1000 may query an operating system or part thereof including aspects operating as a shell, including, but not limited to an immersive shell 1002. From query 1004 to the immersive shell 1002, the settings charm 1000 may gather information regarding an immersive context, application folder information, status of tiles or other display features. For example, the query 1004 may determine a target application. The target application may be the application on which an application context is based and/or from which displayed application and system settings are derived. The target application may be an active application, the application filling the display, or filling a majority of the display, in focus, selected, and/or otherwise indicated as the target application. In an embodiment the target application is determined by the larger of the two viewable immersive applications.

Figure 11A:
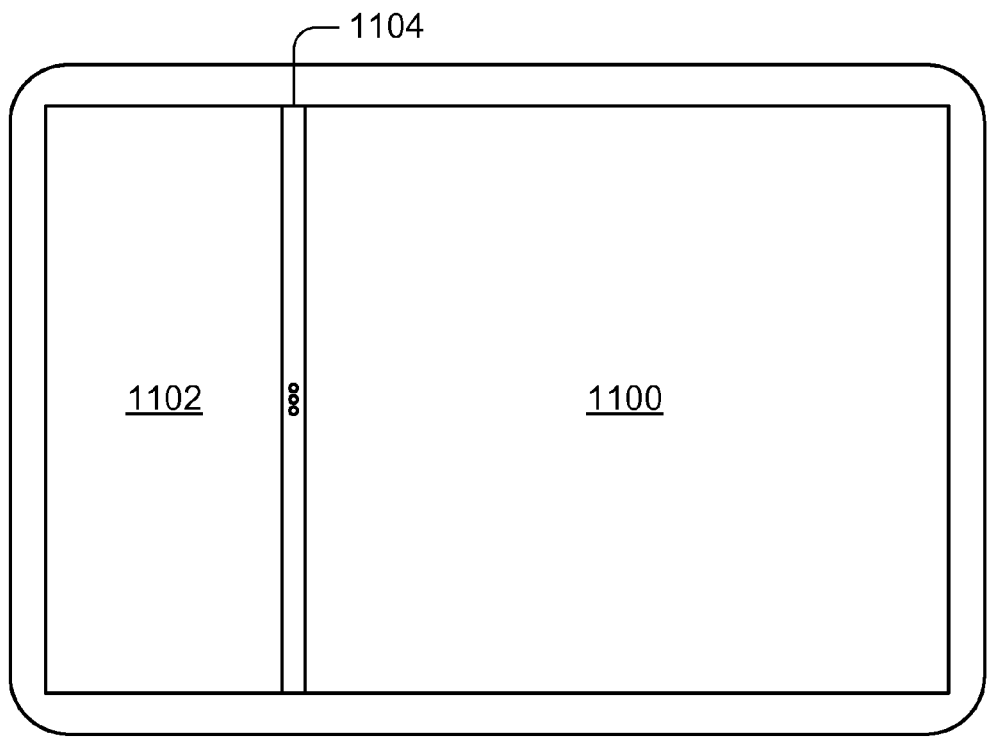
FIGS. 11a and 11b are views of an illustrative embodiment of a change in the display size of an application.
Figure 11B:
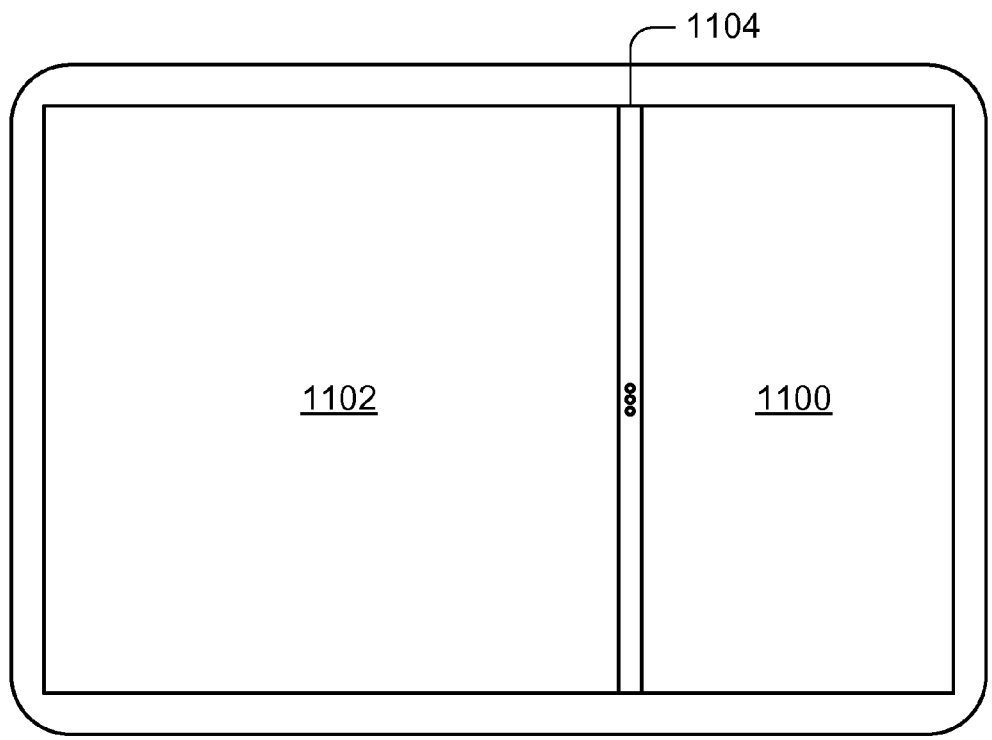

FIG. 11a shows an immersive application 1100 adjacent to an immersive application 1102 separated by separator 1104. In the example shown in FIG. 11a, immersive application 1100 fills a larger portion of the display than does immersive application 1102. According to one embodiment, immersive application 1100 is the target application. Accordingly, settings and information displayed in the access system when viewable would be based on immersive application 1100. Various embodiments contemplate immersive application 1102 becoming the target application when it fills the larger portion of the display as shown in FIG. 11b. An embodiment contemplates that a user may drag the divider 1104 to the right causing the immersive applications to adjust the portion of the display each occupies. Alternatively, a user may identify an immersive application as the target application by touching or otherwise selecting a pane, tile, window, and/or icon corresponding to the target application.

Returning to FIG. 10, the settings charm 1000 may gather additional information by querying 1006, an application store 1008 to gather information about the target application including the status. Settings charm 1000 may also provide a link to application store 1008 by starting a packet data protocol (PDP) 1010. The settings charm 1000 may query 1012 application API 1014 including defined application packages, such as, for example AppX API. This may allow the gathering of application metadata. The settings charm 1000 may gather information by querying 1016 capability providers 1018 to determine the applicability of the capability to the target application, querying 1020 the status of a setting element, as well as effecting the change of an element 1022. The setting charm 1000 may also query 1024 system settings providers 1026 to create and set the status and values of the system settings, for example, similar to system interfaces 214, 320, and 520. The settings charm 1000 may also query 1028 the target application 1030 to determine the system access requested or sought by the target application 1030 and the application defined settings. One embodiment provides that some or all of the information may be contained in an application manifest. Depending on the resources request, the current settings, or changes in settings, the settings charm 1000 may communicate 1032 the changes, invocations, and status of the settings.

Illustrative Computing Device

Figure 12:
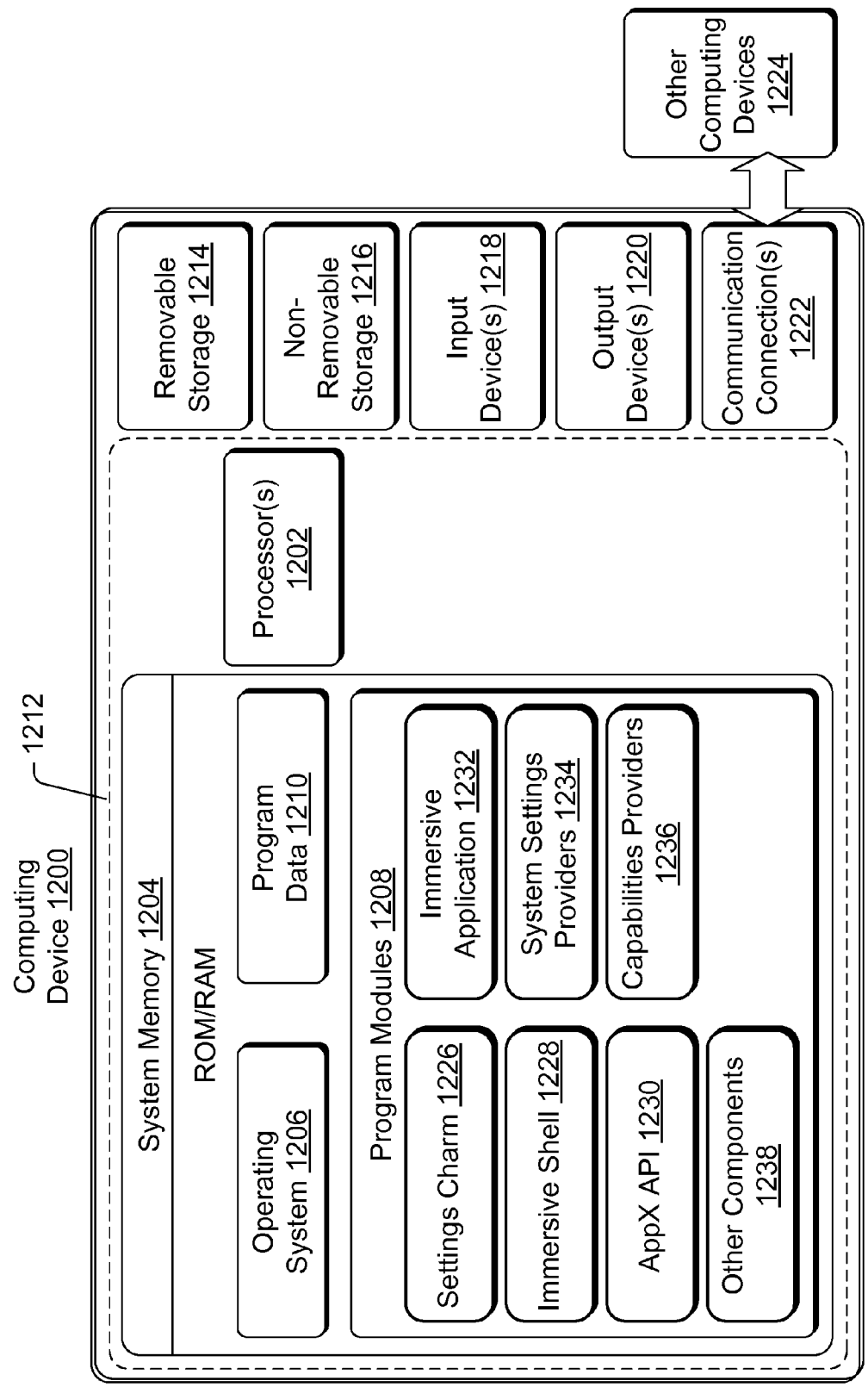
FIG. 12 is a block diagram of an illustrative computing device usable to access system and application settings.

FIG. 12 illustrates a representative computing device 1200 that may, but need not necessarily be used to, implement the settings access system described herein, in accordance with various embodiments. The techniques and mechanisms described herein may be implemented by multiple instances of computing device 1200 as well as by any other computing device, system, and/or environment. The computing device 1200 shown in FIG. 12 is only one example of a computing device and is not intended to suggest any limitation as to the scope of use or functionality of any computing device utilized to perform the processes and/or procedures described above.

In at least one configuration, the computing device 1200 includes at least one processor 1202 and system memory 1204. The processor(s) 1202 may execute one or more modules and/or processes to cause the computing device 1200 to perform a variety of functions. In some embodiments, the processor(s) 1202 may include a central processing unit (CPU), a graphics processing unit (GPU), both CPU and GPU, or other processing units or components known in the art. Additionally, each of the processor(s) 1202 may possess its own local memory, which also may store program modules, program data, and/or one or more operating systems.

Depending on the exact configuration and type of the computing device 1200, the system memory 1204 may be volatile (such as RAM), non-volatile (such as ROM, flash memory, miniature hard drive, memory card, or the like) or some combination thereof. The system memory 1204 may include an operating system 1206, one or more program modules 1208, and may include program data 1210. The computing device 1200 is of a very basic illustrative configuration demarcated by a dashed line 1212. Again, a terminal may have fewer components but may interact with a computing device that may have such a basic configuration.

Program modules 1208 may include, but are not limited to, settings charm 1226, immersive shell 1228, application API 1230, immersive application(s), 1232, system settings providers 1234, capabilities providers 1236, and/or other components 1238.

The computing device 1200 may have additional features and/or functionality. For example, the computing device 1200 may also include additional data storage devices (removable and/or non-removable) such as, for example, magnetic disks, optical disks, or tape. Such additional storage is illustrated in FIG. 12 by removable storage 1214 and non-removable storage 1216.

The storage devices and any associated computer-readable media may provide storage of computer readable instructions, data structures, program modules, and other data. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Moreover, the computer-readable media may include computer-executable instructions that, when executed by the processor(s) 1202, perform various functions and/or operations described herein.

The computing device 1200 may also have input device(s) 1218 such as a keyboard, a mouse, a pen, a voice input device, a touch input device, etc. Output device(s) 1220, such as a display, speakers, a printer, etc. may also be included.

The computing device 1200 may also contain communication connections 1222 that allow the device to communicate with other computing devices 1224, such as over a network. By way of example, and not limitation, communication media and communication connections include wired media such as a wired network or direct-wired connections, and wireless media such as acoustic, radio frequency (RF), infrared, and other wireless media. The communication connections 1222 are some examples of communication media. Communication media may typically be embodied by computer readable instructions, data structures, program modules, etc.

The illustrated computing device 1200 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

Illustrative Processes

For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and any number of the described process blocks may be combined in any order to implement the process, or an alternate process. Moreover, it is also possible that one or more of the provided operations may be modified or omitted.

The processes are illustrated as a collection of blocks in logical flowcharts, which represent a sequence of operations that can be implemented in hardware, software, or a combination of hardware and software. For discussion purposes, the processes are described with reference to the system shown in FIGS. 1-12. However, the processes may be performed using different architectures and devices.

Figure 13:
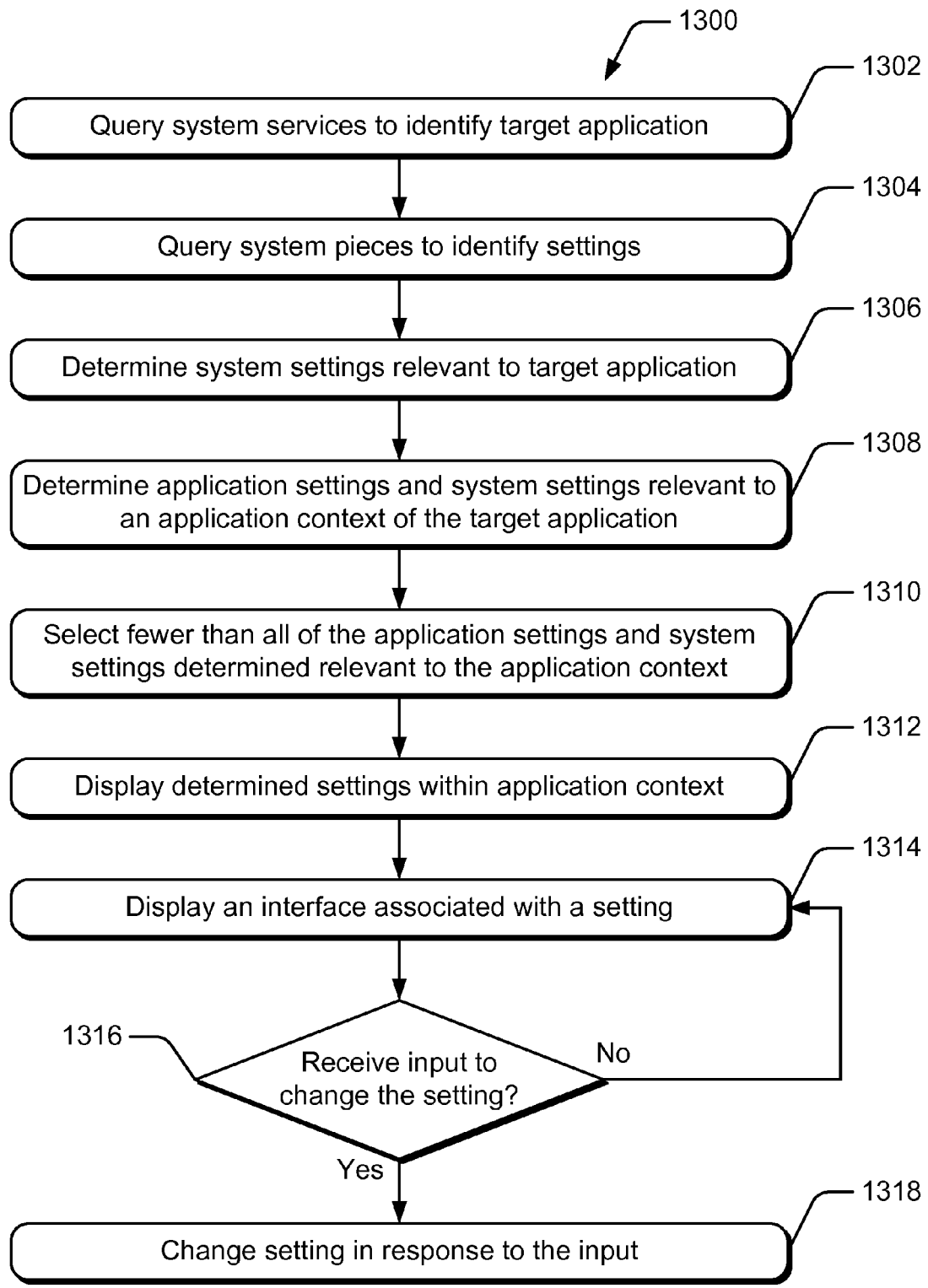
FIG. 13 is a flowchart showing an illustrative method of accessing relevant settings.

FIG. 13 is a flowchart of an illustrative process 1300 of accessing relevant settings. At 1302, a system services is queried to determine the identity of a target application. Steps or operations 1302 and 1304 may collectively be considered one step or operation of gathering application information and system information.

At 1304, system pieces may be queried to identify settings. The settings identified may be system settings or application settings. The system pieces may include, but are not limited to, an application manifest, an application trust subsystem, a devices consent store, and/or dedicated capabilities providers. For example, application identification information may be gathered from an application manifest associated with a target application, application read only capabilities may be gathered from an application trust subsystem or a device consent store, and application configurable capabilities may be gathered from dedicated capabilities providers. The system pieces queried may be based at least in part on information in the application manifest associated with a target application. The querying or gathering may also comprise receiving API commands identifying application settings commands. An embodiment contemplates that the number of available application settings commands may be limited to up to four.

At 1306, the system settings relevant to a target application are determined. A target application may be based at least in part on the number of applications viewable on a display, the relative size of viewable portions of viewable applications on a display, whether or not an application is active or in focus, and/or an indication of an application as a target.

At 1308, the application settings and the system settings relevant to an application context of the target application are determined. The application context may change over the duration that the target application runs. Accordingly, the system settings determined to be relevant may change as the application context changes.

At 1310, a selection of fewer than all of the application settings and system settings determined relevant to the application context is made. Additionally or alternatively, a selection of fewer than all of the application settings and system settings determined relevant to the target application is made. The application context may change over the duration that the target application runs. Accordingly, the system settings determined to be relevant and the selection of fewer that all may change as the application context changes.

At 1312, the application settings and system settings determined to be relevant to the application context are displayed. Additionally or alternatively, the application settings and system settings determined to be relevant to the target application are displayed. Additionally or alternatively, the selection of fewer than all of the application settings and system settings determined to be relevant to the application context are displayed. Additionally or alternatively, the selection of fewer than all of the application settings and system settings determined to be relevant to the target application are displayed. Additionally or alternatively, at least a subset of system controls are always available for selection. For example, the system controls may comprise access to network identifications currently available or connected to; the volume, the brightness of the display; available notifications and ability to stop the notifications; access to the power settings including ability to restart, shutdown, sleep, and/or hibernate; and the language of the controls, for example a keyboard.

At 1314, an interface is displayed that is associated with a setting displayed at 1312. An interface that is displayed may be associated with a sensitive system resource. Sensitive system resources may include resources that, if used, activated, accessed, or otherwise engaged, may affect the security or privacy of a system or user. These may include, but are not limited to, systems or resources determining location, accessing a camera, accessing a microphone, accessing certain data or data folders, displaying notifications, running applications in the background, accessing a device over a network, and/or displaying a badge on a locked screen.

At 1316, if an input to change the setting is not received, the setting and display of the interface is maintained. If an input to change the setting is received, the setting is changed at 1318.

Figure 14:
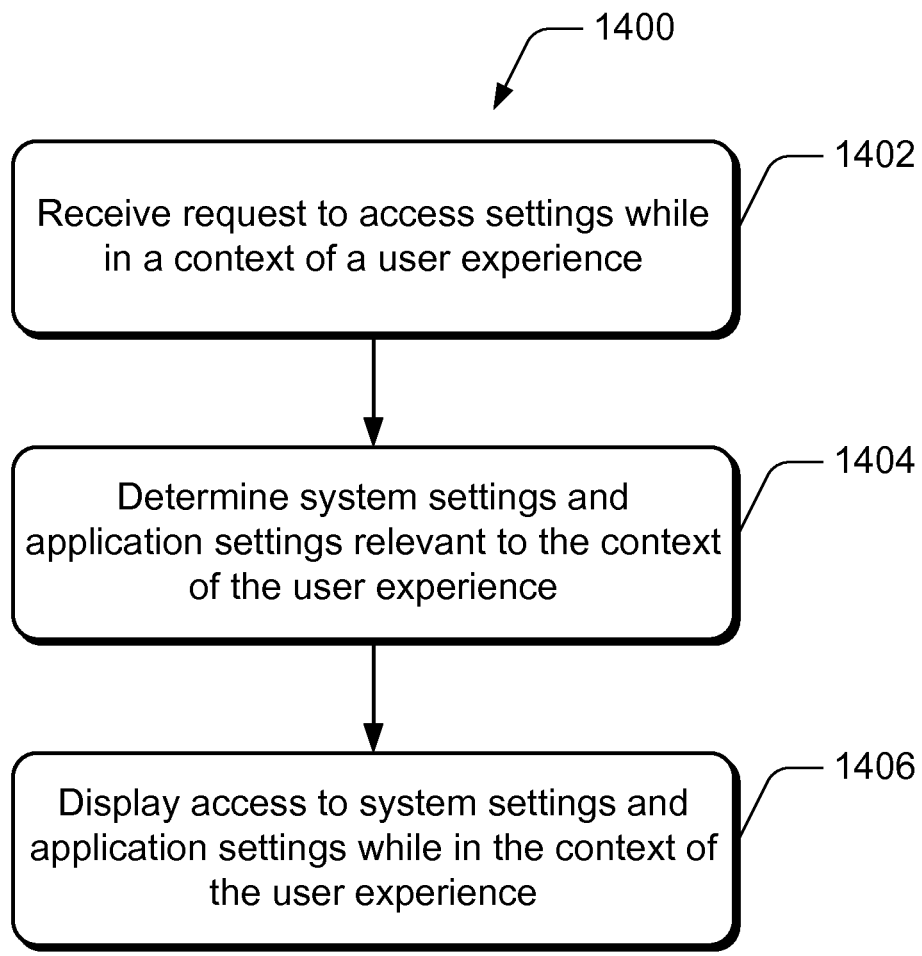
FIG. 14 is a flowchart showing an illustrative method of accessing relevant settings within the context of a user experience.

FIG. 14 is a flowchart of an illustrative process 1400 of accessing relevant settings within the context of a user experience. At 1402, a request to access settings while in a context of a user experience is received. The user experience may comprise, or be base at least in part on, an application context At 1404, system settings and application settings relevant to the context of a user experience is determined.

At 1406, access to the system settings and application settings are displayed while in the context of the user experience. Additionally or alternatively, access to only the relevant system settings and application settings are displayed.

Figure 15:
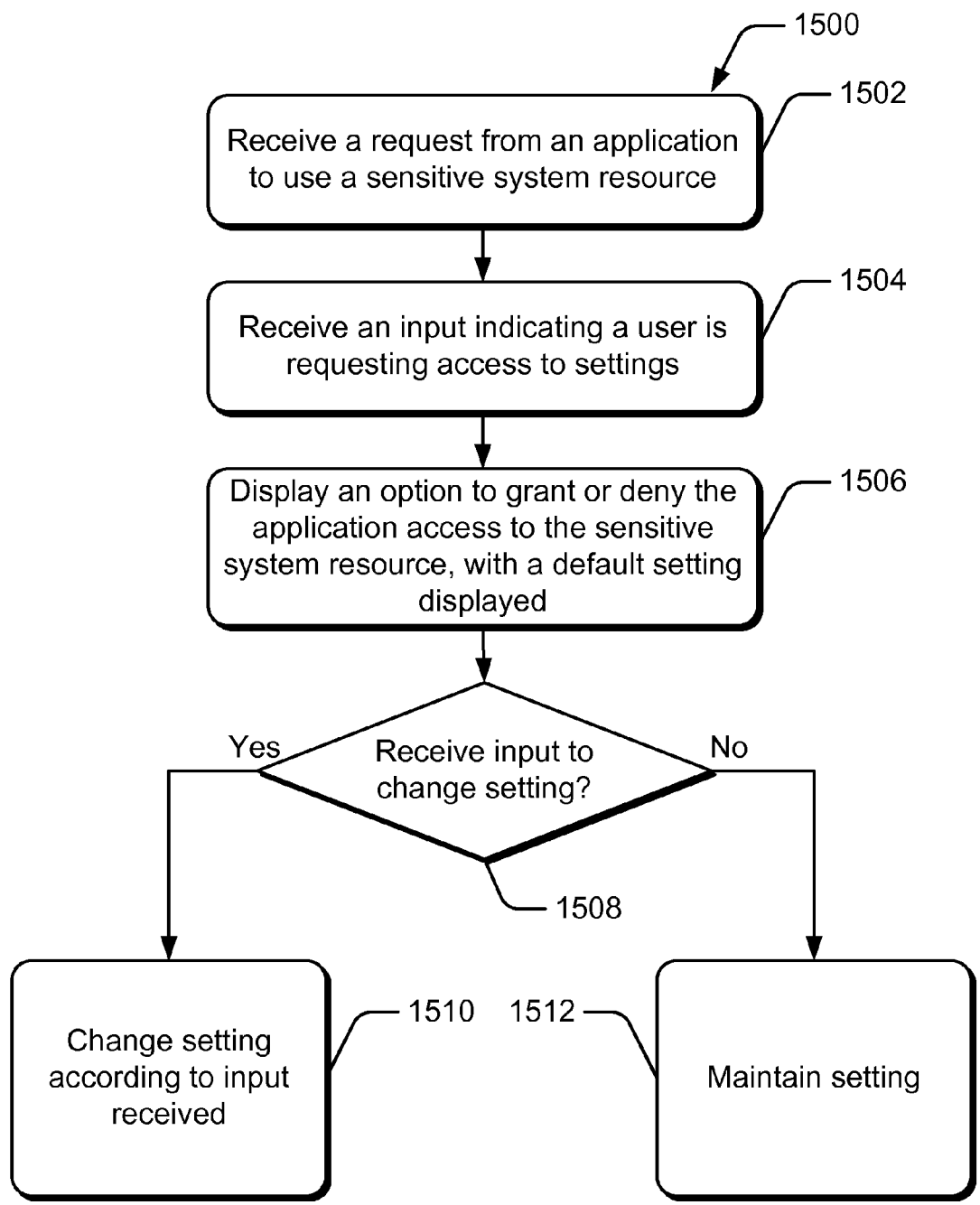
FIG. 15 is a flowchart showing an illustrative method of accessing relevant settings with ability to modify a setting.

FIG. 15 is a flowchart of an illustrative process 1500 of accessing relevant settings with the ability to modify a setting. At 1502, a request from an application to use and/or access a sensitive system resource is received. Sensitive system resources may include resources that, if used, activated, accessed, or otherwise engaged, may affect the security or privacy of a system or user. These may include, but are not limited to, systems or resources determining location, accessing a camera, accessing a microphone, accessing certain data or data folders, displaying notifications, running applications in the background, accessing a device over a network, and/or displaying a badge on a locked screen.

At 1504, an input indicating a user is requesting access to settings is received. An embodiment provides that this input is consistent with a request of a user to view a settings window similar to those discussed with regard to FIGS. 2, 3 and 5.

At 1506, an option to grant or deny the application access to the sensitive system resource is displayed. An embodiment provides that this input is consistent with a request of a user to view a settings window similar to those discussed with regard to FIGS. 6 and 7.

At 1508, if an input is received to change the setting, then the setting is changed according to the input received at 1510. If an input is not received to change the setting, then the setting is maintained at 1512.

Illustrative APIs

Illustrative APIs may provide an application with access to and the ability to control what is displayed in a settings window or extension thereof. Various embodiments contemplate containing API in a dedicated namespace, including, for example, but not limited to Windows.UI.ApplicationSettings namespace. Various embodiments contemplate a namespace providing classes. Classes may allow developers to define application settings commands that appear in settings windows and the resulting action taken if selected.

Illustrative classes include, but are not limited to the following:

SettingsCommand: May create a settings command object that represents a settings entry. This settings command may be added to the SettingsPaneCommandsRequestedEventArgs.ApplicationCommands property.

SettingsPane: May be a static class that enables the application to control a settings window or a settings charm window. The application may receive a notification when the user opens the charm, or open the charm programmatically.

The namespace may also have enumerations. For example, the Windows.UI.ApplicationSettings namespace may have the following enumerations: KnownSettingsCommand: May specify a known predefined settings command.

The enumerations may have members. For example, the KnownSettingsCommand enumeration may have the following members:

About: value=0; predefined UI About command;
Help: value=1; predefined UI Help command;
PrivacyStatement: value=2; predefined UI Privacy Statement command; and
TermsOfUse: value=3; predefined UI Terms of Use command.

For example, to add a known settings command "About" and a custom setting command called "Advanced" the developer may write the following code:

```
In JavaScript:
    function onCommandsRequested(e) {
            var n = Windows.UI.ApplicationSettings;
            var vector = e.applicationCommands;
            var aboutCmd = new
    n.SettingsCommand(n.KnownSettingsCommand.about,
    onAboutCmd);
            vector.append(aboutCmd);
            var advancedCmd = new
    n.SettingsCommand("advanced.settings", "Advanced"
    onAdvancedCmd);
            vector.append(advancedCmd);
    }
    function onLoad( ) {
            var n = Windows.UI.ApplicationSettings;
            var settingsPane =
    n.SettingsPane.getForCurrentView( );
            settingsPane.addEventListener("commandsrequested",
    onCommandsRequested);
    }
In C#:
    using Windows.UI.ApplicationSettings;
    this.SettingsPane = SettingsPane.GetForCurrentView( );
    this.SettingsPane.CommandsRequested += new
    TypedEventHandler<SettingsPane,
    SettingsPaneCommandsRequestedEventArgs>(OnCommandsRequested);
    public void OnCommandsRequested(SettingsPane
    settingsPane, SettingsPaneCommandsRequestedEventArgs
    eventArgs)
    {
        SettingsCommand aboutCommand = new
        SettingsCommand(KnownSettingsCommand.About, new
        UICommandInvokedHandler(this.AboutCallback));
        eventArgs.ApplicationCommands.Add(aboutCommand);
        SettingsCommand advancedCommand = new
        SettingsCommand("advanced.settings", "Advanced", new
        UICommandInvokedHandler(this.AdvancedCallback));
        eventArgs.ApplicationCommands.Add(advancedCommand);
    }
In C++:
    using namespace Windows::UI::ApplicationSettings;
    auto settingsPane = SettingsPane::GetForCurrentView( );
    settingsPane->CommandsRequested += ref new
    Windows::Foundation::TypedEventHandler<SettingsPane^,
    Objects^>([ ](SettingsPane^ pane,
    SettingsPaneCommandsRequestedEventArgs^ eventArgs)
```

-continued

```
{
    auto commands = eventArgs->ApplicationCommands;
    SettingsCommand^ cmd = ref new
    SettingsCommand(KnownSettingsCommand::About ,
    aboutHandler);
    commands->Append(cmd);
    cmd = ref new SettingsCommand(L"advanced.settings",
    L"Advanced", advancedHandler);
    commands->Append(cmd);
};
```

CONCLUSION

The subject matter described above can be implemented in hardware, software, or in both hardware and software. Although implementations have been described in language specific to structural features and/or methodological acts, it is to be understood that the subject matter defined in the appended claims is not necessarily limited to the specific features or acts described above. Rather, the specific features and acts are disclosed as example forms of implementing the claims. For example, the methodological acts need not be performed in the order or combinations described herein, and may be performed in any combination of one or more acts.

The invention claimed is:

1. A system for accessing settings, the system comprising:
one or more processors;
a touch screen communicatively coupled to the one or more processors;
memory; and
programming instructions stored on the memory that, based on execution by the one or more processors, configure the one or more processors to:
receive, via the touch screen, user input comprising a swipe from an edge of the touch screen toward a center of the touch screen;
responsive to receiving the user input:
query system services to identify a target application that is currently displaying content via the touch screen;
determine an application setting that is specific to the target application and that is designated by the target application to be exposed through a settings access bar;
determine a system setting that is implemented by the system and that is applicable to a plurality of applications;
cause display of, via the touch screen, the settings access bar along at least a portion of the edge of the touch screen while the content of the target application is being displayed, the settings access bar comprising an application section and a system section, the settings access bar including a first interface element in the application section to enable the application setting to be configured and a second interface element in the system section to enable the system setting to be configured;
while the settings access bar is displayed, receive, via the touch screen, additional user input;
responsive to the additional user input selecting the first interface element, configure the application setting;
responsive to the additional user input selecting the second interface element, configure the system setting; and
responsive to the receipt of the additional user input being outside the settings access bar, remove display of the settings access bar on the touch screen.

2. The system of claim 1, the determining the application setting includes querying at least one of an application manifest, an application trust subsystem, a devices consent store, or dedicated capabilities providers.

3. The system of claim 1, the one or more processors further configured to determine the target application based at least in part on a size of one or more viewable portions of the target application compared to other sizes of other viewable portions of other applications.

4. The system of claim 1, the determining the application setting includes selecting system pieces to query based at least in part on information from an application manifest associated with the target application.

5. The system of claim 1, the determining the application setting includes:
gathering application identification information from an application manifest associated with the target application;
gathering application read only capabilities from an application trust subsystem or a device consent store; or
gathering application configurable capabilities from dedicated capabilities providers.

6. The system of claim 1, the one or more processors being further configured to receive application programming interface (API) commands identifying application settings commands.

7. The system of claim 1, the determining the application setting includes selecting fewer than all of a plurality of application settings and the determining the system setting including selecting fewer than all of a plurality of system settings.

8. The system of claim 1, the determining the application setting or the determining the system setting is based on at least one of an application type, an application mode, an application state, or an application function.

9. The system of claim 1, the determining the application setting or the determining the system setting is based on a context of the target application, the context of the target application being dynamic and changeable, the context corresponding to at least one of a current mode of the target application, a current state of the target application, or a current function of the target application.

10. The system of claim 1,
the application section comprising:
an application identification;
a system access link; and
one or more application settings commands; and
the system section comprising one or more system interfaces.

11. The system of claim 10, the one or more application settings commands displayed being contextually determined by the target application.

12. The system of claim 1, at least one of determining the application setting or determining the system setting includes identifying sensitive system resources to which access is requested by the target application, the sensitive system resources comprising system resources directly influencing security or privacy of the system.

13. The system of claim 12, the sensitive system resources comprising at least one of determining location, accessing a camera, accessing a microphone, displaying notifications, running applications in the background, accessing a networked device, or displaying a badge on a lock screen.

14. The system of claim 1, the programming instructions being part of an operating system (OS) running on the system.

15. One or more computer-readable storage media storing computer-executable instructions that, based on execution by one or more processors, configure the one or more processors to:
- receive a request to access settings while in a context of a target application, the request comprising user input received at a location on a display common to multiple applications executing on a device;
- query system services to identify the target application displaying content on the device;
- determine an application setting that is specific to the target application and that is designated by the target application to be exposed through a settings access bar;
- determine a system setting that is implemented by the device and that is applicable to the multiple applications;
- display the settings access bar while the content of the target application is being displayed, the settings access bar comprising an application section and a system section, the settings access bar including a first interface element in the application section to enable the application setting to be configured and a second interface element in the system section to enable the system setting to be configured;
- receive additional user input for one or more of the first interface element, the second interface element, or the displayed content;
- when the additional user input selects the first interface element, configure the application setting;
- when the additional user input selects the second interface element, configure the system setting; and
- when the additional user input is received outside the settings access bar, remove display of the settings access bar.

16. A device comprising:
- a processor;
- memory storing instructions that, based on execution by the processor, configure the device to:
  - receive a user input to access settings while in a context of a target application, the user input received at a location on a display, the location being a same location for each of a plurality of applications currently executing on the device;
  - query system services to identify the target application currently displaying content on the device;
  - determine the context of the target application based at least in part on the content being displayed by the target application or functions being performed by the target application;
  - determine an application setting that is specific to the target application and that is relevant to the target application;
  - determine a system setting that is implemented by the device and that is applicable to the plurality of applications;
  - cause display of a settings access bar along at least a portion of an edge of the display while the content of the target application is being displayed, the settings access bar comprising an application section and a system section, the settings access bar including a first interface element in the application section to enable the application setting to be configured and a second interface element in the system section to enable the system setting to be configured;
  - while the settings bar is displayed, receive additional user input;
  - when the additional user input selects the first interface element, configure the application setting;
  - when the additional user input selects the second interface element, configure the system setting; and
  - when the additional user input is received outside the settings access bar, remove display of the settings access bar.

17. The device of claim 16, wherein the user input is a movement of a mouse cursor into the location on the display.

* * * * *